J. H. ROGERS.
DETACHING HORSES.

No. 183,212.　　　　　　　　　　Patented Oct. 10, 1876.

Witnesses:
Donn J. Twitchell.
Hill W. Dodge.

Inventor:
James H. Rogers.
By his atty.
Dodge & Son.

UNITED STATES PATENT OFFICE.

JAMES H. ROGERS, OF CHARLESTON, WEST VIRGINIA.

IMPROVEMENT IN DETACHING HORSES.

Specification forming part of Letters Patent No. 183,212, dated October 10, 1876; application filed September 11, 1876.

*To all whom it may concern:*

Be it known that I, JAMES H. ROGERS, of Charleston, in the county of Kanawha and State of West Virginia, have invented certain Improvements in Carriages and other Vehicles, of which the following is a specification:

The present invention relates to improvements in the safety-vehicle for which Letters Patent were granted to me September 8, 1874, No. 154,807; and consists in the use of a spring-arm to withdraw the king-bolt and check the fall and headway of the body when the forward wheels separate therefrom; in the use of runners under the forward end of the body to slide upon the ground in the event of the body falling thereto, and in other details.

Figure 1:
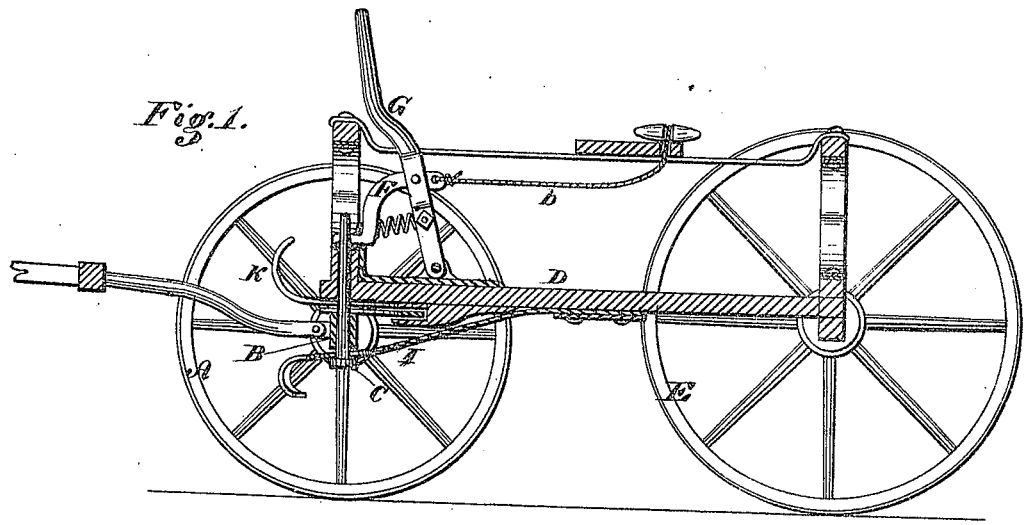
Figure 2:
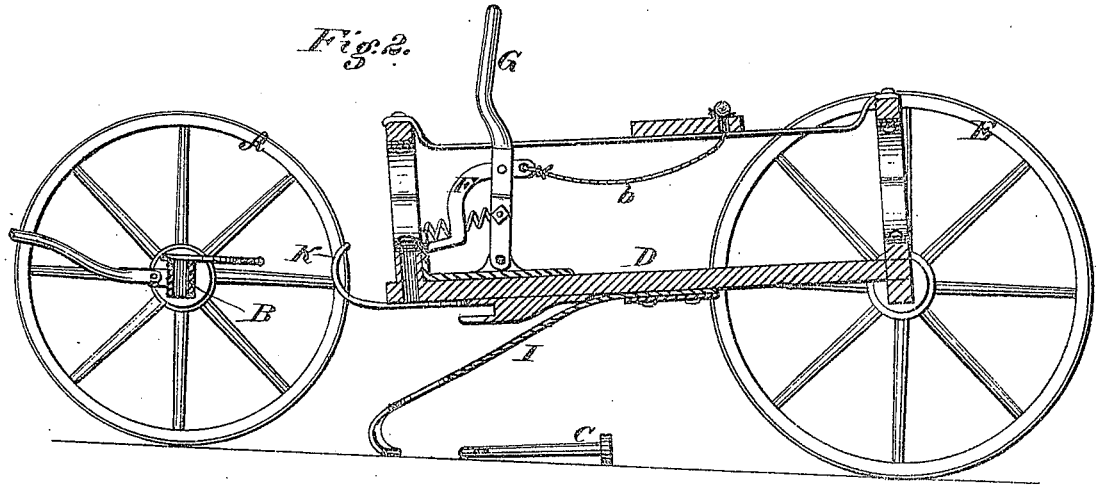

Figure 1 represents a longitudinal vertical central section of my improved vehicle; Fig. 2, a similar section, showing the forward wheels detached.

A A represent the two forward wheels, mounted on the ends of the axle B, which is united by the king-bolt C to the forward end of the reach-bar D, which latter has its rear end secured as usual to the rear axle, mounted in two wheels, E. The king-bolt, as in my original patent, is inserted from below, and held from falling out by means of a sliding key, F, which is connected at its rear end to a hand-lever, G, mounted on the reach-bar, and extended upward in such position that it may be conveniently operated by persons riding in the front part of the vehicle. When the vehicle has a long body, with two or more seats, a cord or chain, b, is connected to the rear end of the key or to the hand-lever, and passed upward through the floor of the body at its rear end, so that it may be reached by the occupants of the back seats.

In order to insure the fall of the king-bolt when the key F is withdrawn, the bolt is made tapering in form, and arranged with the small end uppermost, as shown. A spring-arm, I, is also secured to the under side of the reach-bar, and the king-bolt passed upward through its end, as shown, so that the spring, drawing downward upon the bolt, withdraws it from the reach and axle the instant that the key F is drawn back by means of the lever or cord.

The arm I is made quite heavy and strong, curved under at its forward end, and arranged to spring downward below the reach-bar when released, so that when the front wheels separate from the body the latter is sustained, and checked in its fall by the arm riding upon the ground, as shown in Fig. 2, the arm also serving as an elastic shoe or runner, and gradually checking the forward movement of the body.

In order to prevent the end of the body from entering the ground, and being thereby brought violently to a stop in case the weight therein is so great as to overcome the spring-arm, shoes or runners K are located under the forward end of the body, as shown, to ride upon the ground.

These shoes may be formed by curving upward the forward portion of the fifth-wheel or swivel-plate, as shown, or they may be separate pieces secured firmly in place.

When in use the vehicle operates in precisely the same manner as those of ordinary construction; but in the event of the team becoming unmanageable and running away, or of their turning so suddenly as to endanger the overturning of the vehicle, the occupant has only to pull upon the cord or the hand-lever, which will withdraw the key and permit the release of the king-bolt, thereby allowing the front wheels and axle to separate from the body, which latter will be sustained and brought gently to a rest by means of the spring-arm.

By thus permitting the team to separate with the front axle and wheels, and then sustaining and checking the body, I avoid all danger of injury to either the vehicle or its occupants, and render the ordinary serious accidents avoidable.

Having thus described my invention, what I claim is—

1. The spring-arm I, attached to the reach-bar, and arranged to operate substantially as described.

2. In combination with the reach-bar of a carriage or similar vehicle, a spring-support, I, constructed and arranged substantially as described and shown, to sustain and check the movement of the body in the event of the separation of the front axle and wheels therefrom.

3. The combination of the tapering king-bolt C, spring I, and key F, with devices substantially such as shown for controlling said key.

4. The arms or runners K, constructed and arranged substantially as shown and described.

5. In combination with the key F, arranged as and for the purpose described, the lever G and cord $b$, as shown.

JAS. H. ROGERS.

Witnesses:
P. T. DODGE,
W. C. DODGE.